F. L. O. WADSWORTH.
GLASS WORKING MACHINE.
APPLICATION FILED JUNE 27, 1918.

1,326,235.

Patented Dec. 30, 1919.

Witness
Frank A. Sable

Inventor
Frank L. O. Wadsworth
By
Hood & Schley
Attorneys

UNITED STATES PATENT OFFICE.

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

GLASS-WORKING MACHINE.

1,326,235.

Specification of Letters Patent. Patented Dec. 30, 1919.

Original application filed April 24, 1914, Serial No. 834,233. Divided and this application filed June 27, 1918. Serial No. 242,264.

*To all whom it may concern:*

Be it known that I, FRANK L. O. WADSWORTH, a citizen of the United States, residing at Pittsburgh, in the county of Allegheny and State of Pennsylvania, have invented a new and useful Glass-Working Machine, of which the following is a specification.

My invention relates to improvements in machines for the automatic production of glass articles, whereby there may be a substantial reduction of the time interval during which the delivery of glass to the machine must be interrupted, with a consequent increase in the relative time available for filling or charging the molds of glass-receiving receptacles, thus making possible a substantial increase in the speed of operation of the machine, the arrangement being such that the delivery of the molten glass to the shaping receptacles may be accomplished at a minimum working temperature and in a homogeneous physical condition.

Figure 1:
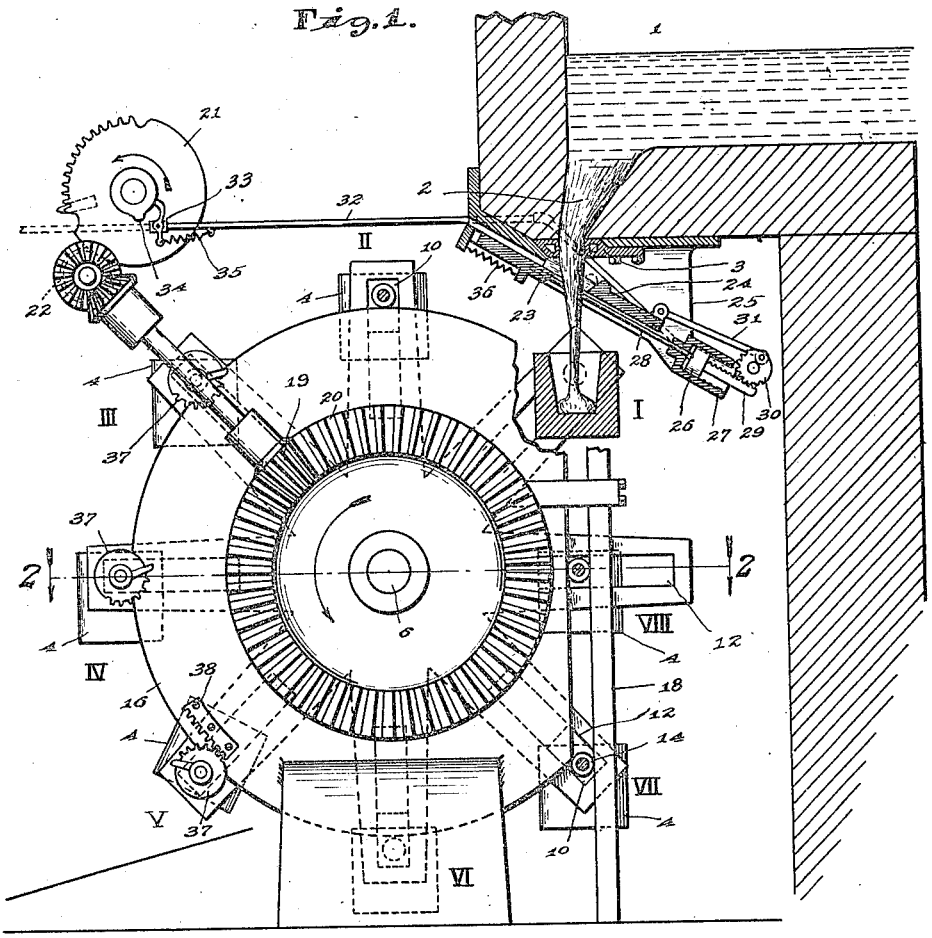
Figure 2:
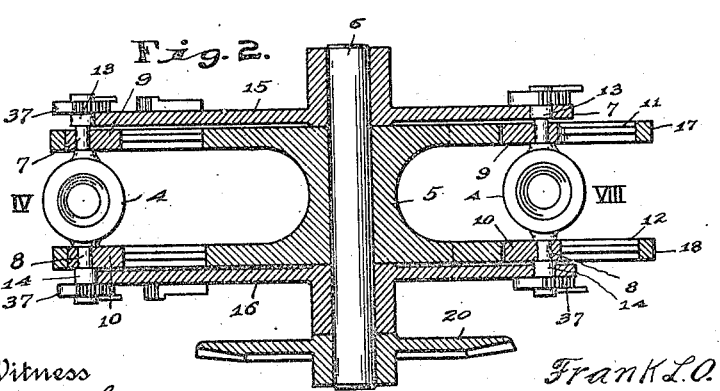

In the drawings, Figure 1 is an elevation, in partial vertical section, of a machine embodying my invention; Fig. 2 a section on line 2—2 of Fig. 1.

The present application is a division from my application 834,233, filed April 24, 1914, and discloses one of several forms of devices, all of which are characterized by a common mode of operation, in which a series of molds is carried through a cycle of operations in such manner that each one is brought in succession to a point directly beneath another mold which is being charged, and then lifted vertically in the charging line to the ultimate charging position, a charged mold being withdrawn from charging position so that the charging operation may take place during the upward movement of the oncoming mold. By this arrangement, an empty mold is always in position to receive a charge of material as soon as a filled mold has been removed from the charging position by a distance only slightly greater than half its diameter. This greatly reduces the interval during which the delivery of glass to the successive molds must be interrupted and is, therefore, of particular advantage when such delivery is to be automatically secured by the use of a constantly or intermittently flowing stream from a major source of supply. It will be evident, however, that mechanism of the character disclosed in this application may be used in connection with hand-charging operations.

In the drawings, 1 indicates a chamber containing a large supply of molten glass which is delivered through an orifice 2, in the floor of the chamber through a water-cooled, or other suitable ring 3, of metal, so constructed and mounted that it can be readily removed and replaced by another having an opening of different size, when desired.

The molds or receptacles 4, 4, 4, etc., which are to be filled with glass from the flowing stream, are mounted on a frame 5 which rotates on a horizontal axis 6, and which, by its rotation, brings the molds successively to the positions I, II, III, IV, V, VI, VII, and VIII.

In the position I, the receptacle is in place to receive its final charge, while in positions VII and VIII the receptacles are vertically in line beneath the position I, so that in passing from position VII to position I, the receptacles move vertically upward in line with the downwardly flowing stream of glass.

The guiding of the molds to and through the successive positions which they occupy in the rotation of the frame 5, and the maintenance of the molds in the desired position through these movements, is effected in the following manner:

Each mold is provided above the center of gravity with a pair of trunnions 7 and 8 which bear in blocks 9 and 10 slidably mounted in radial slots 11 and 12 in the arms of the rotating frame 5. The trunnions 7 and 8 are extended on each side of the blocks 9 and 10 to receive rollers 13 and 14 and these rollers engage, during rotation of the frame, with fixed tracks, or ways, 15, 16, 17 and 18, in a manner clearly shown in the drawings.

The shaft 6, carrying frame 5, is rotated step by step through the intervals separating the successive mold position, ⅛ of a revolution in the form shown, by means of a pinion 19 which engages the gear 20 on the outer end of shaft 6. This step-by-step movement is effected by rotating the gear 19 through one complete rotation at the desired intervals by means of the interrupted toothed gear 21 which is mounted on the main driving shaft of the machine and revolves constantly and engages with an interrupted toothed pinion 22. Any desired intermittently acting or other driving mechanism for frame 5 can, of course, be adopted without departing from the spirit of my invention.

The arrangement which I have shown in this case for severing the glass stream and interrupting its flow to the molds while the latter are being moved, consists of two reciprocating blades 23 and 24 which are mounted in ways on the frame 25 and are moved by means of a piston 26 in a cylinder 27. The piston 26 is directly connected to the blade 23 by means of rods 28 and it is also connected to the blade 24 through the medium of a rack 29 which engages with a toothed crank disk 30, the latter being coupled to the blade 24 by means of a connecting rod 31. The piston 26 is actuated by means of compressed air or steam which is lead to the cylinder 27 through a pipe 32. This pipe contains a two-way valve 33 which is opened and closed at the desired intervals by the joint action of a cam 34 and a spring 35.

The operation is as follows:—A mold is maintained in the position I until a sufficient quantity of glass has been delivered thereto, or is ready for delivery thereto from the flowing stream. It will be readily apparent that this quantity may be acquired before the lower end of the stream actually enters the receptacle. The two-way valve 33 is then opened by the action of the cam 34 and the piston 26 is moved outwardly in the cylinder 27, thereby moving the blades 23 and 24 to sever the stream at a point slightly below the orifice in the block 3. Simultaneously with the severing of the glass, the pinion 22 is engaged by the toothed segment of the driving gear 21 and the mold frame 5 set in movement, thus carrying the filled mold from position I toward position II and lifting an empty mold from the position VIII to the charging position I. As soon as the filled mold has moved laterally to one side sufficiently to clear the line of flow of the glass, the cutting blades 23 and 24 are opened by the movement of the two-way valve 33 to its exhaust position, thereby relieving the pressure in the cylinder 27 and allowing the parts of the cutting mechanism to be returned to their opened position by means of a spring 36 or some equivalent device. This permits the glass to resume its flow directly downward toward the mold which is rising from position VIII.

When the molds are in the various successive positions II, III, IV, etc., the glass contained therein may be subjected to various forming operations by pressing, blowing, etc., and when the molds reach the position V, they may, if desired, be inverted to discharge the formed articles, or the still molten glass, by means of gears 37 which may be secured to the trunnions 13 and 14 and arranged to be engaged by fixed racks 38 on the guides 15 and 16.

I claim as my invention:

1. A glass working apparatus comprising a rotary member having a horizontal axis and a plurality of receptacles carried by said member and rotatable therewith, and means for automatically shifting said receptacles toward and from the axis of the rotary member during rotation of said member and keeping the same upright whereby said members will be caused to travel in a substantially vertical line during a portion of their orbit.

2. Glass working apparatus comprising a rotary member having a horizontal axis and a plurality of radially extending receptacle guides, a plurality of receptacles slidably mounted one in each guide, and a second guide coöperating with the receptacles to produce relative radial movement during rotation of the carrying member whereby the receptacles are brought successively to a low position and raised therefrom substantially vertically and upright and thereafter shifted laterally, a pivotal support for each mold, a pinion carried by each mold, and means for engaging said pinion successively to invert the molds.

3. Glass working apparatus comprising a rotary member having a horizontal axis and a plurality of radially extending receptacle guides, a plurality of receptacles slidably mounted one in each guide, and a second guide coöperating with the receptacles to produce relative radial movement during rotation of the carrying member whereby the receptacles are brought successively to a low position and raised therefrom substantially vertically and upright and thereafter shifted laterally.

4. Glass working apparatus comprising a rotary member having a horizontal axis and a plurality of radially extending receptacle guides, a plurality of receptacles slidably mounted one in each guide, and a second guide coöperating with the receptacles to produce relative radial movement during rotation of the carrying member whereby the receptacles are brought successively to a low position and raised therefrom substantially vertically and upright and thereafter shifted laterally, and a pivotal support for each mold.

In witness whereof, I have hereunto set my hand at Pittsburgh, Pennsylvania, this eighteenth day of June, A. D. one thousand nine hundred and eighteen.

FRANK L. O. WADSWORTH.